United States Patent [19]
Foladare et al.

[11] Patent Number: 6,049,602
[45] Date of Patent: Apr. 11, 2000

[54] VIRTUAL CALL CENTER

[75] Inventors: Mark Jeffrey Foladare, Kendall Park; Shelley B. Goldman, East Brunswick; David Phillip Silverman, Somerville; Shaoqing Q. Wang, Middletown; Roy Philip Weber, Bridgewater; Robert S. Westrich, Middletown, all of N.J.

[73] Assignee: AT&T Corp, New York, N.Y.

[21] Appl. No.: 08/933,518

[22] Filed: Sep. 18, 1997

[51] Int. Cl.[7] .................................................. H04M 3/00
[52] U.S. Cl. ...................... 379/265; 379/93.03; 370/352
[58] Field of Search .................................... 379/265, 266, 379/309, 308, 207, 219, 220, 93.02, 93.03, 93.12, 188, 196, 197, 198, 189; 370/351, 352, 353–356, 270; 709/204, 205

[56] References Cited

U.S. PATENT DOCUMENTS

| | | | |
|---|---|---|---|
| 5,291,551 | 3/1994 | Conn et al. | 379/265 |
| 5,392,345 | 2/1995 | Otto | 379/265 |
| 5,459,780 | 10/1995 | Sand | 379/265 |
| 5,619,557 | 4/1997 | Van Berkum | 379/265 |
| 5,778,060 | 7/1998 | Otto | 379/265 |
| 5,884,032 | 3/1999 | Bateman et al. | 379/265 |

OTHER PUBLICATIONS

Convergence Call Center Solutions Product Overview, Rockwell Switching Systems Division, Rockwell International Corporation, Downers Grove, IL, 1996.

"Aspect WINSET 2.0 For Windows", Aspect Telecommunications Press Release, Internet page http://www.aspect.comp/pr–winset2.html, (This copy printed Aug. 15, 1997).

"Aspect Telecommunications Integrates the Web into the Call Center . . . ", Aspect Telecommunications Press Release, Internet page http://www.aspect.com/pr–agility2.html (This copy printed Aug. 15, 1997).

*Primary Examiner*—Krista Zele
*Assistant Examiner*—Benny Q. Tieu
*Attorney, Agent, or Firm*—Stephen M. Gurey; William Ryan

[57] ABSTRACT

Call center functions are provided to a plurality of remotely located customer service representatives (CSRs) via a data network, such as the Internet. Each CSR station includes a telephone and a computer. Separate log-in procedures for the computer and the telephone improve system security. Incoming calls are routed to an available CSR. A call control server provides call control pages that include a set of clickable commands (e.g., transfer, hold, conference, speed-dial buttons, and the like) and telephone digits to CSR computers that allow CSRs to remotely control telephone calls. A merchant server can also provide a merchant application page to CSR computers to allow CSRs to process customer calls.

33 Claims, 3 Drawing Sheets

VIRTUAL CALL CENTER

TECHNICAL FIELD

The present invention relates to telephone services, and more particularly to a system for providing call center functionality at a remotely located representative using a data network, such as the Internet.

BACKGROUND OF THE INVENTION

Presently, customer service representatives or agents located at call centers answer incoming 800 number calls to accept product orders, provide customer information, etc. Typically, call centers are centrally located on the merchant's premises. However, with densely populated cities and the associated traffic problems, it is desirable to allow customer service representatives to work at home. In addition, it is advantageous to permit temporary or part-time customer service representatives (which may be hired during holidays or busy periods) to also work from home.

Two problems arise when permitting customer service representatives to work remotely from home. First, it can be difficult to ensure the security of the system. Because the representatives are remotely located, there is a risk that unauthorized personnel will improperly receive access to incoming 800 number calls.

Second, remote workers should be provided the same functionality as call center workers working at the central call center. Remote workers should be provided the merchant application (e.g., a merchant's product order form) to process customer orders in the same manner as performed by representatives located at the central call center on the merchant's premises. More significantly, remote customer service representatives should have full call control functions, such as the ability to place a call on hold, transfer a call, conference together two parties, speed dial functions, etc. Such call control features are not available on analog telephones over analog telephone lines (i.e., POTS lines). Rather, to provide these call control features on a telephone requires a digital telephone operating over a specialized digital telephone line, such as an Integrated Services Digital Network (ISDN) line, and additional equipment. As a result, it is prohibitively expensive to run a digital telephone line and install the necessary equipment to allow each representative to work from home.

Therefore, a need exists for a technique to provide full call center functionality (e.g., the merchant application and full call control functionality) to remote workers and to improve system security.

SUMMARY OF THE INVENTION

The present invention overcomes the disadvantages and drawbacks of the prior art by providing a virtual call center wherein remotely located customer service representatives (CSRs) are provided with full call center functionality via a data network. In addition system security is improved by using separate computer and telephone log-in procedures (including authentication).

The present invention provides call center functionality at each of a plurality of remote CSR stations. Each remote CSR station includes a computer and a telephone.

First, a CSR logs in to the system using the CSR computer. The CSR and/or the CSR computer is then authenticated. After the CSR has logged in by computer, and been computer authenticated, a Voice Response Unit (VRU) places a call to the CSR's remote telephone number and prompts the CSR for a telephone password. The CSR can input the telephone password, for example, as one or more touch tone signals and/or one or more spoken phrases or words.

After the CSR is logged in by computer and by telephone, the CSR is now prepared to receive and process incoming customer calls. A call is received at the switch, and the CSR is selected to receive the call. The switch transfers the call to the CSR station telephone for processing.

A data communications link is established over a data network between the call control server and the CSR station computer. The call control server sends a call control page (e.g., a Web page or a Telnet page) to the station computer. The call control page includes one or more selectable call control commands (e.g., hold, transfer, terminate, conference) and telephone digits. The CSR can actuate or click on one or more of the call control commands to remotely control incoming telephone calls via the data network. A signal corresponding to the actuated command is sent from the station computer to the switch via the call control server to control the call. In this manner, a data network can be employed to provide remote call center functionality to the CSR without the necessity of expensive digital telephone equipment and digital telephone lines. In addition, a merchant server can provide a merchant application page to the station computer to allow the CSR to process the received call.

DETAILED DESCRIPTION

Figure 1:
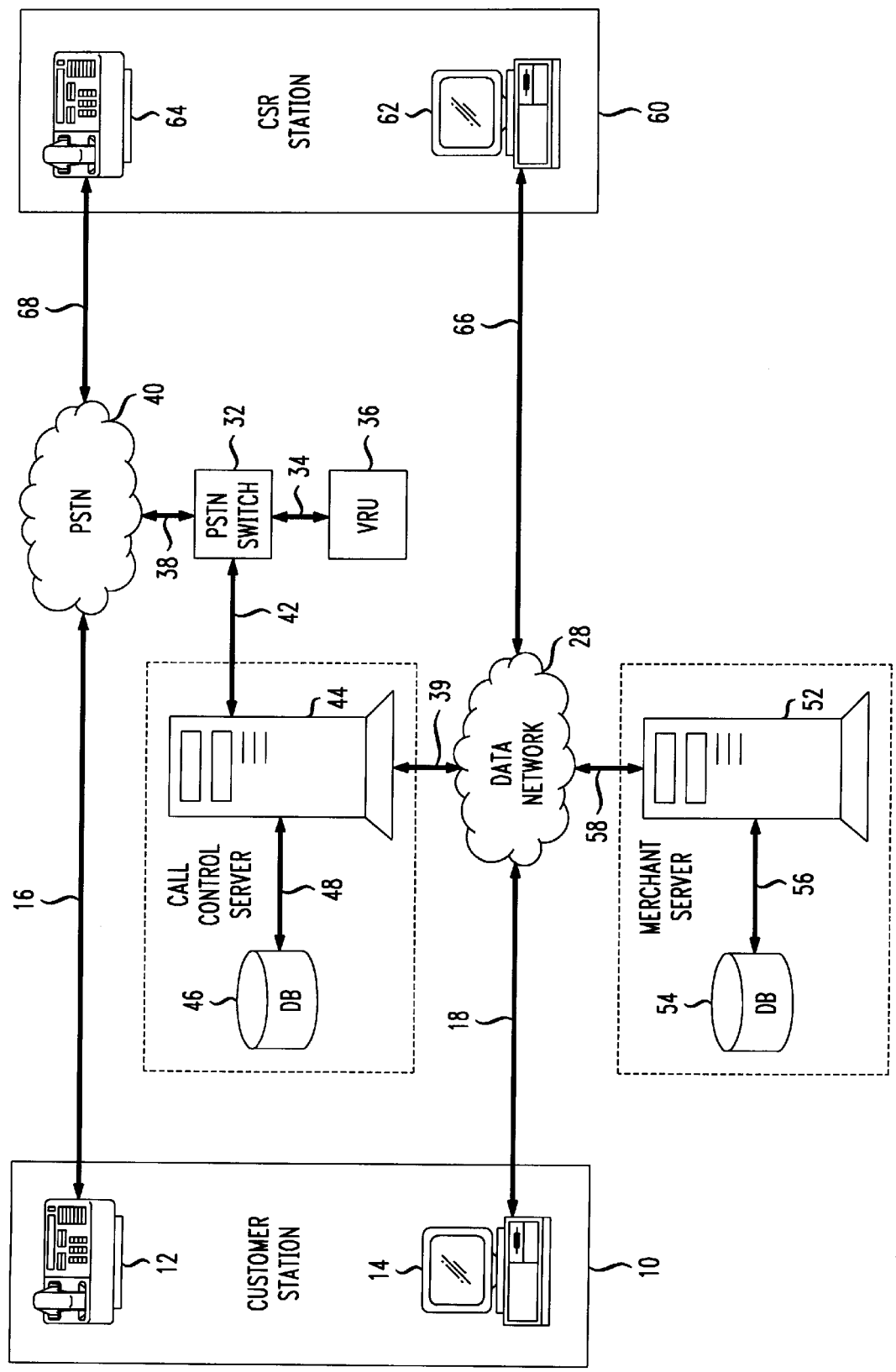
FIG. 1 is a block diagram of a system for providing call center functionality at a remote station according to an embodiment of the present invention.

Referring to the Figures in which like numerals indicate like elements, FIG. 1 is a block diagram of a system for providing call center functionality at a remote station according to an embodiment of the present invention. Each customer service representative (CSR) is remotely located at a CSR station 60. Each CSR station 60 includes a telephone 64 and a CSR computer 62. In one embodiment of the present invention, each customer located at a customer station 10 may dial, for example, the merchant's toll free 1-800 telephone number to place a product or service order, ask questions, etc. Rather than placing all CSRs at the centrally located call center, each CSR is remotely located at a CSR station 60. Each incoming call is routed to an available CSR. A merchant application and call control functions are provided via data network (e.g., the Internet) to each remotely located CSR.

Referring to FIG. 1, a customer station 10 includes a telephone 12 and a computer 14. Telephone 12 is connected to the public switched telephone network (PSTN) 40 by line 16. Computer 14 is connected via line 18 to data network 28. Data network 28 can be a packet switched network such as the Internet, or an Intranet. Other types of data networks can be used. Data sent over data network 28 can be encrypted, for example, using a 128 bit RSA algorithm.

PSTN 40 is connected to a PSTN switch 32 via line 38. Switch 32 is part of PSTN 40. Switch 32 receives incoming calls from telephone 12 (and other telephones) and routes the calls to the appropriate destination via PSTN 40. Instead of a PSTN switch, switch 32 may alternatively be a Private Branch Exchange (PBX) switch, or other type of switch.

A voice response unit (VRU) 36 is connected to switch 32 via line 34. VRU 36 automatically answers telephone calls received at switch 32 and prompts the caller with a series of menu options or questions. VRU 36 also temporarily stores caller responses which may be provided as spoken answers and/or dialed or touch tone answers. VRU 36 includes, for example, dual tone multi-frequency (DTMF) tone generator and decoder, and speech recognition and speech synthesis equipment. In one embodiment, switch 32 and VRU 36 may be implemented as a Conversant Voice System, available from Lucent Technologies, Inc.

A call control server 44 is connected to switch 32 via line 42. Calls received at switch 32 are routed by switch 32 under control of call control server 44 to a selected CSR station 60 for processing. A CSR database 46 is connected to call control server 44 via line 48. The following information can be stored in CSR database 46 or call control server 44 for each CSR:

(1) telephone log-in information for each CSR, including a remote telephone number (such as the CSR's home voice telephone number), and a telephone password (for example, as touch tone signals, and/or as digitized speech signals); Also, additional information may be stored that can be used to authenticate the CSR over the telephone (voice line), such as a voice font of the CSR that uniquely identifies the CSR's voice to be used for voice recognition; and (2) computer log-in information that (allows each CSR to log-in to call control server 44, including the CSR's name, a computer log-in ID and password, and the IP address and port number (stored dynamically) and the certificate ID of the computer used by the CSR. Additional information may also be stored in CSR database 46. Alternatively, this information may be stored in call control server 44.

Because there is two-way communication between VRU 36 and call control server 44 via switch 32, all or part of the telephone log-in information and the computer log-in information may alternatively be stored in VRU 36.

Call control server 44 also keeps track of which CSRs have logged into the system and which are currently available to receive incoming calls (e.g., those CSRs not on break and not processing another telephone call). As a result, call control server 44 maintains a list of the currently available CSRs, and updates the list after, for example, assigning an incoming call to a CSR, or after receiving notice from a CSR that the CSR has logged-in, logged-out or is on break. The updated list of available CSRs can be constantly made available to switch 32 and VRU 36. Alternatively, VRU 36 can keep track of the CSRs and maintain the list of available CSRs.

Call control server 44 provides a call control page to each of the CSR stations 60. Each of the call control pages include a set of clickable commands (e.g., transfer, hold, conference, speed-dial buttons, and the like) and telephone digits that allow CSRs to remotely control telephone calls using CSR computer 62. The call control page provides each remotely located CSR with call control functions via the data network 28 without the use of expensive digital telephones, digital lines and digital modems. The call control page could be, for example, a Telnet page, a Web page, or the like that may be pushed or downloaded from call control server 44 via data network 28 to the computer being used by the CSR (CSR computer 62). The call control server 44 can identify the computer being used by the CSR based on, for example, the IP address and port number of the CSR's computer stored in CSR database 46 or call control server 44.

A merchant server 52 is connected to data network 28 via line 58. A merchant database 54 is connected to merchant server 52 via line 56 and stores customer information including each customer's name, address, telephone number, account history or purchase history, credit card number(s), clothing sizes for different family members and other customer information. Merchant server 52 provides merchant application pages (such as Telnet pages, Web pages or the like) to each CSR computer 62. The merchant application pages can include, for example, customer order entry forms which allow CSRs to receive and process customer orders received via telephone for products and/or services offered by the merchant.

The CSR station 60 includes CSR computer 62 for receiving call control pages and merchant application pages and other information, and a telephone 64 for receiving telephone calls. Computer 62 is connected to data network 28 via line 66. Computer 62 can establish a data communications link (such as a Telnet connection or a TCP connection) with other computers via data network 28. In this manner, computer 62 can receive Web pages and/or Telnet pages or the like, and send and receive data via data network 28.

Likewise, telephone 64 can establish a voice communications link with other telephones via PSTN 40 by initiating telephone calls to other telephones, and by receiving telephone calls from other telephones.

Although only one CSR station is illustrated in FIG. 1, the system of FIG. 1 would typically include many CSR stations at different remote locations. For example, each CSR's home or residence could operate as a remote CSR station if properly equipped with a telephone and a personal computer.

To reduce costs, telephone 64 should be a standard analog telephone, and lines 66 and 68 should be standard analog telephone lines, such as Plain Old Telephone System (POTS) lines. However, other types of telephones and telephone lines can be employed.

Computers 14 and 62 may be standard personal computers which may include a processor, memory, a modem and a monitor or display. Computers 14 and 62 can each include a Web browser, such as Netscape Navigator, available from Netscape Communications Corp., to download, for example, Web pages from other computers on the World Wide Web.

In operation, a customer service representative (CSR) located at CSR station 60 is provided with full call center functionality at computer 62, including (1) the merchant application (e.g., a merchant's product order form to process customer orders), and (2) full call control functions, such as the ability to place a call on hold, transfer a call, conference together two parties, speed dial functions, etc. Such call control functions are not available to analog telephones over analog telephone lines (i.e., POTS lines).

The call control page includes a set of clickable commands and phone digits which allow the CSR to issue commands to call control server 44. Once the call control commands are received at call control server 44, call control server 44 can then control switch 32 to control the call based on the call control commands (e.g., transfer the call, place the call on hold, conference in a specified party). The merchant application (e.g., merchant product order form) can be provided from merchant server 52 to computer 62 as one or more pages (e.g., Telnet or Web pages, or the like).

The operation of the system of FIG. 1 according to an embodiment of the present invention can be described as two processes: 1) the log-in process for a CSR, and 2) the processing of incoming telephone calls. These two processes are described in detail hereinbelow with reference to FIGS. 2 and 3, respectively.

The Log-In Process

Figure 2:
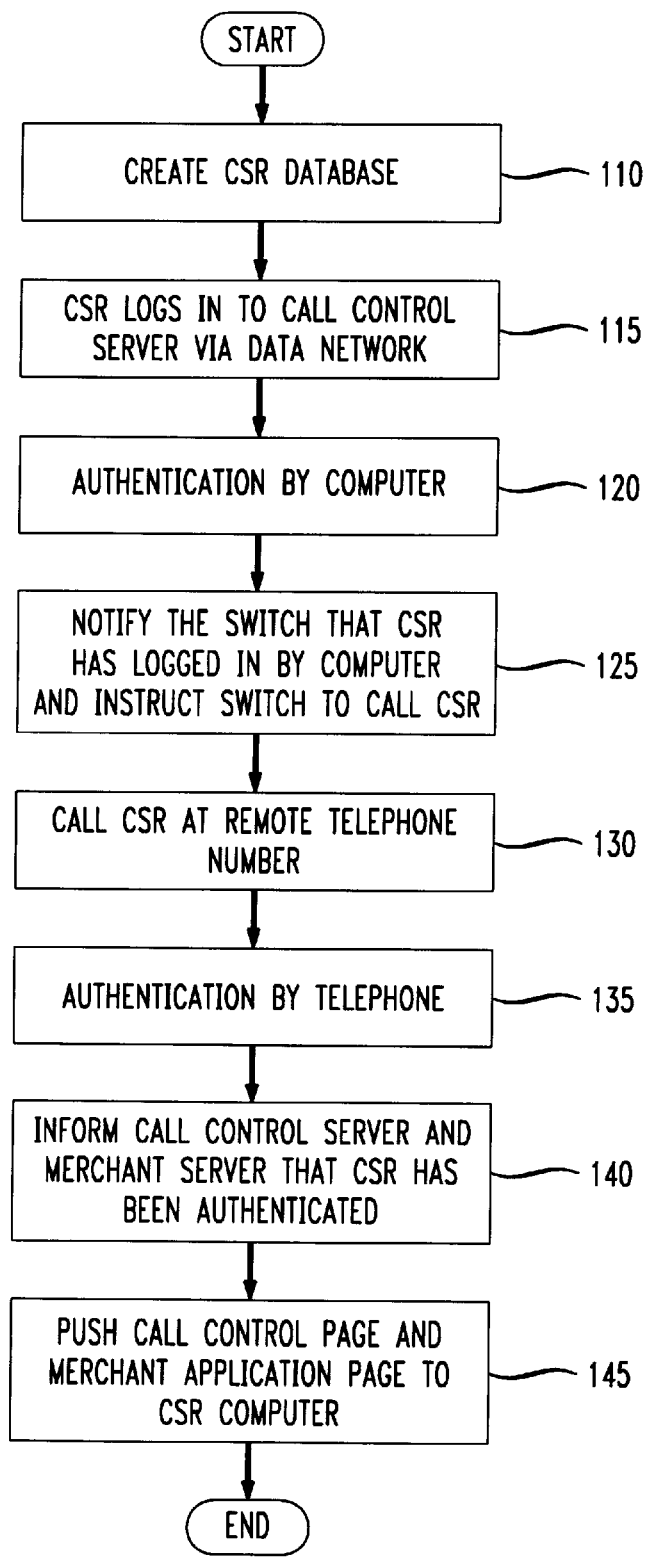
FIG. 2 is a flow chart illustrating the log-in process according to an embodiment of the present invention.

FIG. 2 is a flow chart illustrating the log-in process for a customer service representative (CSR) according to an embodiment of the present invention.

At step 110, a CSR database is created by storing (1) telephone log-in information for each CSR, including a remote telephone number (such as the CSR's home voice telephone number), and a telephone password (for example, as touch tone signals, and/or as digitized speech signals); and (2) computer log-in information that allows each CSR to log-in to call control server 44, including the CSR's name, address, a log-in ID and password (for computer 62). The IP address and port number of the CSR computer 62 is dynamically stored only after the CSR has logged in by computer to call control server 44, as described in greater detail below. The information created at step 110 may be stored, for example, in either database 46, call control server 44 or VRU 36.

At step 115, the CSR logs in to call control server 44 via data network 28. To log-in to call control server 44, first, the CSR uses computer 62 to establish a data communications link between computer 62 and call control server 44 via data network 28. The data communications link can be established using well known protocols such as TCP/IP, so that the on-line information from server 44 is available in the form of Web pages or the like to computer 62. For example, a TCP connection may be established between computer 62 and server 44. The CSR then uses a Web browser to download the Web page provided by call control server 44 for the purpose of CSR computer log-in. The CSR then inputs his or her log-in ID and password. The inputted computer log-in ID and password are then transmitted back to the call control server 44 via the data communications link established between CSR computer 62 and call control server 44. In addition, the Certificate ID of computer 62 or a Cookie may also be transmitted to server 44. Other information useful for authentication may also be transmitted to server 44.

Once call control server 44 receives the login-ID, password, the Certificate ID and/or the Cookie from the CSR computer 62, server 44 then authenticates the CSR and/or the CSR computer 62, step 120. First, server 44 compares the computer log-in ID and password received from computer 62 to the log-in ID and password stored in database 46. If a match is found, then the CSR is authentic. Next, server 44 can authenticate computer 62 by comparing the Certificate ID and/or Cookie provided by computer 62 to the Certificate ID and/or Cookie stored in CSR database 46. If a match is found, the computer 62 is authentic.

If the CSR and/or the computer 62 is found to be authentic, the computer log-in process (including authentication) is completed. The IP address and port number of computer 62 received from the computer 62 over the data communications link during the log-in process is dynamically stored in database 46. As described hereinbelow, this address information can be used by call control server 44 and merchant server 52 to provide Web pages to CSR computer 62.

Once the computer log-in and authentication process is completed, the process of FIG. 2 then proceeds to step 125. However, if the CSR and/or the computer 62 are not authentic, the process is terminated, and an error message may be returned to be displayed on computer 62.

At step 125, call control server 44 notifies switch 32 that the CSR has logged in over the computer, and has been computer authenticated. Also, server 44 then instructs the VRU 36 and switch 32 to call the CSR (telephone 64) at the CSR's remote telephone number stored in database 46.

At step 130 and in response to step 125, VRU 36 and switch 32 call the CSR at the CSR's remote telephone number stored in database 46 to perform the telephone log-in and authentication process. As a result, switch 32 calls telephone 64 of CSR station 60 via PSTN 40, and the CSR answers the call using telephone 64.

At Step 135, the telephone log-in and authentication process is performed. VRU 36 prompts the CSR to provide a telephone ID and then a telephone password (using telephone 64). Alternatively, VRU 36 may only prompt the CSR for a telephone password. For example, VRU 36 may prompt the CSR by stating: "Please speak or touch tone your call center password now." The CSR then inputs the telephone password either as one or more DTMF touch tones, and/or by speaking the password.

VRU 36 receives and decodes the password using a DTMF decoder (for a password input as touch tones), and uses speech recognition equipment to analyze a spoken password. The received password is then compared to the CSR's password stored in CSR database 46. If a match is found, the CSR is now authenticated by telephone. The telephone log-in and authentication process is now complete.

Other techniques may be used to authenticate the CSR via telephone. Rather than requesting and analyzing a password, VRU 36 may instead employ voice recognition equipment and software to compare the voice spoken by the CSR to the voice font (or voice sample) for the CSR stored in database 46.

At Step 140, switch 32 logs-in the CSR to merchant server 52 by informing merchant server 52 that the CSR has been authenticated (by computer and by telephone) and is now ready to receive and process incoming phone calls. Switch 32 also provides the IP address and port number of CSR computer 64 to merchant server 52. Switch 32 also informs call control server 44 that the CSR has been authenticated by telephone and is now ready to receive and process incoming telephone calls. (Call control server 44 previously completed the computer login and authentication process at Step 120). Call control server 44 then places the CSR on the list of available CSRs.

At Step 145, call control server 44 pushes a call control page (e.g., a Web page, a Telnet page) to CSR computer 62, and merchant server 52 pushes a merchant application page (e.g., a Web page, a Telnet page) to CSR computer 62.

The call control Web page includes a clickable set of commands and phone digits which allows the CSR to issue commands using computer 62 to call control server 44 regarding incoming calls. The call control commands provided to the CSR can include an answer command instructing call control server 44 to connect the received (or a specified) telephone call to the CSR telephone 64; a hangup or terminate command instructing the call control server 44 to disconnect or terminate the received telephone call; a transfer command instructing the call control server 44 to transfer the received telephone call to another party; a conference command instructing the call control server 44 to conference in another party for the telephone call; a hold command instructing the call control server 44 that the received call should be placed on hold; one or more speed dial commands instructing the call control server 44 to transfer the call to a party specified by the speed dial command, or to call the party specified by the speed dial command.

The present invention also includes a break request/break return command. This command, for example, can be toggled by the CSR between the "break request" and the "break return" commands. If the "break request" command has been selected, this instructs call control server 44 that the CSR is unavailable and/or on break. In such case, call control server 44 will remove the CSR from the list of available CSRs. As a result, the call control server 44 will not forward any incoming calls to a CSR that is on break or is unavailable. If the "break return" command has been selected, this instructs call control server 44 that the CSR has now returned from break and is now available to receive calls. Upon receiving the "break return" command, call control server then adds the CSR to the list of available CSRs.

Call control server 44 and merchant server 52 are shown in FIG. 1 as separate servers. Alternatively, the functions of control server 44 and merchant server 52 can be combined into a single server. This single server would provide both the call control page and the merchant application page to CSR computer 62.

Processing of Incoming Telephone Calls

Figure 3:
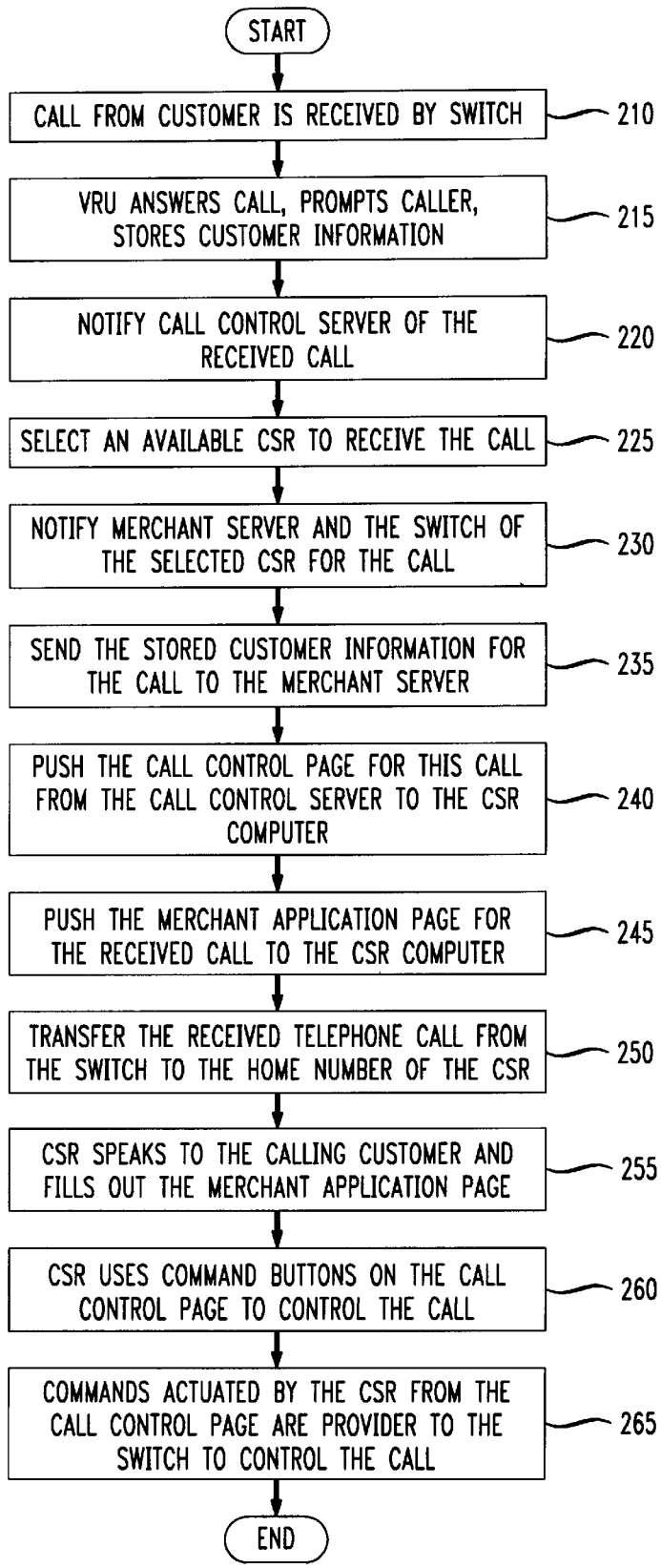
FIG. 3 is a flow chart illustrating the processing of an incoming telephone call according to the embodiment of the present invention.

FIG. 3 is a flow chart illustrating the processing of an incoming telephone call according to the embodiment of the present invention. The process illustrated in FIG. 3 assumes that one or more CSR's have previously completed the log-in by computer and the log-in by telephone, and are prepared to receive and process incoming telephone calls.

At Step 210, a voice communications link is established between the customer and switch 32. This voice communications link can be established two ways.

First, a customer can call the merchant using telephone 12 by dialing, for example, the merchant's 1-800 telephone number.

Second, instead of the customer calling the merchant, the merchant CSR may alternatively call the customer. In one embodiment, a customer using computer 14 may have established a data communications link (e.g., a TCP connection) with merchant server 52 and accessed one or more Web pages from merchant server 52. As the calling customer views the information provided on the merchant's Web pages, the customer may wish to speak to a CSR, for example, to request product information or to place an order. The merchant Web page that is being viewed by the customer at customer station 10 may include a "call me" button. When the "call me" button is selected by the customer using the browser on computer 14, a signal (e.g., a packet) is sent from computer 14 to merchant server 52 indicating that the customer would like the merchant to telephone the customer at telephone 12. The signal can also provide the customer's telephone number. The merchant CSR then calls the customer. This "call me" feature of the present invention may be accomplished as disclosed in pending U.S. patent application Ser. No. 08/736,150, filed on Oct. 24, 1996, and entitled "System and Method for Establishing Internet Communications Links", assigned to AT&T Corporation, hereby incorporated by reference in its entirety.

At Step 215, VRU 36 answers the call from the customer and prompts the customer. The voice communications link (telephone call) between the switch 32 and the customer is connected to VRU 36, regardless whether the customer or the switch placed the call. When the call is received at the VRU 36, the VRU 36 prompts the customer using a series of menus. For example, the customer may be requested to input his telephone number, address, credit card numbers, account number or information identifying a product which he or she is interested in, etc. The customer may be requested to identify (e.g., select from a list) the reason for calling (e.g., to obtain customer service, to place an order, to request product repairs, to obtain an account balance or account information). This information is input by the customer, for example, by speaking or using the touch tones on telephone 12. This information is then stored in memory, which may be resident in either VRU 36, switch 32, server 44, database 46, server 52 or database 54. Information identifying the customer's telephone number (identified by an ANI signal) and/or information identifying the dialed number (identified by a DNIS signal) may also be provided by PSTN 40 and stored in memory.

At Step 220, switch 32 notifies call control server 44 and merchant server 52 of the received call.

At Step 225, an available CSR is selected to receive and process the received call. Call control server 44 would typically select an available CSR to receive the call because server 44 keeps track of the status (logged in, on break, returned from break, busy, etc.) of each CSR and maintains a list of available CSRs.

Alternatively, at step 225, VRU 36, switch 33, switch 55 or merchant server 52 may obtain the list of available CSRs from server 44 and select one of the CSRs to receive the call. Call control server 44 would then be notified of the selected CSR so the selected CSR can 1) receive the call and 2) be removed from the list of available CSRs.

At Step 230, call control server 44 notifies the merchant server 52 and the switch 32 of the selected CSR for the call. The merchant server 52 can also be provided with the IP address and port number for the computer 62 of the selected CSR.

At Step 235, the customer information (e.g., customer account number, customer's name, address, telephone number, reason for calling) and the ANI and DNIS information received and stored at step 215 is then sent to merchant server 52 for storage. Alternatively, this information may be directly stored on merchant server 52 at step 215.

At Step 240, the call control page (e.g., call control Web page or Telnet page) for controlling the received call is pushed from the call control server 44 to the CSR computer 62. The call control page for this call includes a series of clickable commands and telephone digits that allows the CSR to control the received call. The call control web page is received at computer 62 and displayed on computer 62 to be viewed by the CSR. This call control page can be used for all calls to be routed to the CSR for processing.

Alternatively, a call control page may be provided after the CSR logs in to the call control server 44 via computer and via telephone (e.g., step 145, FIG. 2). This call control page would be used for all calls routed to the CSR.

At Step 245, the merchant server selects a merchant application page, inserts customer information into the application page, and pushes the partially completed page to the CSR computer 62. As a result, step 245 may involve several sub-steps The ANI signal information (or information input by the customer) stored in merchant server 52 may be used by merchant server 52 to identify from the merchant database 54 a customer file or customer record corresponding to the customer's home telephone number indicated by the ANI signal.

Also, there may be many merchant application pages (e.g., Web pages) available from merchant server 52. For example, merchant server 52 may provide different web pages for different types of customer requests, such as requests for customer service, requests to place an order, a request for repairs, etc. Merchant server 52 may select one of the several available merchant application pages based on the DNIS signal or based on information input by the calling customer to VRU 36. For example, the DNIS signal may identify one of several 1-800 numbers dialed by the calling customer to the merchant, wherein a different 1-800 number is used for each type of available service (customer service, repair service, to place an order, etc.).

As part of step 245, in one embodiment of the present invention, the merchant server 52 inserts at least a portion of the following into one or more selected merchant application Web pages: 1) customer information input by the customer to VRU 36, 2) the customer records or files identified by ANI signals or identified by information input by the customer (e.g., account number, telephone number), and 3) the telephone numbers identified by the ANI and DNIS signals. Based on the IP address and port number of CSR computer 62, the merchant server pushes these partially completed merchant application pages to CSR computer 62 via data network 28. The partially completed pages are received and displayed on computer 62 to be viewed by the CSR.

At Step 250, switch 32 transfers the received telephone call via PSTN 40 under control of call control server 44 to the remote CSR telephone 64 at CSR station 60.

At Step 255, the CSR processes the telephone call by speaking to the calling customer using telephone 64 and using computer 62 to fill out the remainder of the merchant application page to accept the customer's product order or other request. The completed merchant application page is transmitted from CSR computer 62 to merchant server 52.

At Step 260, the CSR actuates one or more of the clickable call commands and telephone number digits on the call control page to control the call. (e.g., hold, transfer, conference, and other commands).

At step 265, a signal corresponding to the command actuated by the CSR on the call control page (at step 260) is transmitted (e.g., as one or more packets) from the CSR computer 62 to call control server 44 via data network 28. The signal corresponding to the actuated call control command is then communicated to switch 32 to allow the switch to perform the requested action on the telephone call that has been routed to the CSR telephone 64.

Improved System Security

Because the CSRs are remotely located from the call center, call control pages and customer calls will be transferred to equipment located remotely from the central call center. As a result, it is possible for unauthorized persons to access the call control server 44 and thereby improperly direct customer calls and call control pages to unauthorized equipment. This type of security breach could result in a significant disruption to the merchant's business and a loss of goodwill.

However, the use of separate computer and telephone log-in and authentication procedures as taught by present invention greatly improves system security. First, a CSR can be authenticated by computer using a login ID and password. Second, the CSR's computer itself can be authenticated using the computer's unique Certificate ID, a Cookie, or other unique number stored in the computer 62 and known to call control server 44. Finally, after the CSR has logged in to call control server 44 by computer and been computer authenticated (e.g., either CSR authentication and/ or computer authentication), the VRU 36 places a call lo the CSR's remote telephone number that was previously stored in memory, and may prompt the CSR for a telephone password (telephone log-in and authentication).

Telephone authentication is important because it confirms that the CSR has in fact logged in to server 44, rather than an unauthorized person. While a computer hacker may be able to access and duplicate a login ID, password, and even a Certificate ID, it is unlikely that the hacker could redirect the telephone call (for telephone authentication) from the VRU 36 to the hacker's telephone number. Moreover, it is also unlikely that the hacker would know the CSR's telephone password. Therefore, the use of telephone authentication greatly improves system security where calls and information are provided to remote persons.

Each of the authentication techniques, however, may be used separately, or in combination. It is desirable to use two or more of the authentication techniques together.

Monitor Stations

Although not shown, the system of FIG. 1 can also include one or more remotely located monitor stations. Like the CSR station 60, each monitor station includes a telephone (such as an analog telephone) for initiating and receiving telephone calls, and a computer for receiving Web pages or Telnet pages and for sending and receiving data. A supervisor remotely located at his or her monitor station (e.g., at home) can log-in to call control server by both computer (data) and telephone (voice) in the same manner as the CSRs. Once properly logged-in and authenticated by computer and telephone, the supervisor's computer at the monitor station receives a monitor Web page from call control server 44 that provides a list of all active telephone calls in the system. The supervisor can listen or monitor any active call by clicking on the call listed on the monitor Web page. Also, using the commands on the monitor Web page, the supervisor can elect one-way communication (e.g., the supervisor can only listen), or can elect two-way communications, allowing the supervisor to listen and speak with the parties on the selected call. Clicking on a call on the monitor Web page sends a signal to the call control sever 44 that instructs the server 44 and switch 32 to connect the supervisor's telephone to the selected call. This allows the supervisor to remotely monitor the active calls without using expensive digital telephone lines and digital telephone equipment.

AN EXAMPLE

An example of the operation of the present invention will now be briefly explained. A CSR uses computer 62 to log in to call control server 44. Call control server 44 authenticates computer 62 (e.g., using a Certificate ID or Cookie from computer 62) and the CSR (using the login-ID and password input by the CSR). The VRU is then instructed to call and authenticate the CSR by telephone.

After authenticating the CSR by computer and by telephone, the call control server 44 and merchant server are notified that the CSR has been authenticated. The IP address and port number of the CSR computer 62 obtained in a packet from the CSR computer 62 during the computer log-in process are stored in CSR database 46. This address information is provided to servers 44 and 52.

Call control server 44 then pushes a call control Web page to the CSR computer 62, including a clickable set of call control commands and telephone digits.

An incoming call is received at PSTN 40 and routed to switch 32. Call control server 44 is notified of the telephone call, and selects the CSR from the list of available CSRs. Call control server 44 then notifies switch 32 that the received call should be forwarded to the CSR telephone 64. Switch 32 then routes the call via PSTN 40 to CSR telephone 64 for processing.

The merchant server 52 selects a merchant application Web page for product order based on the number dialed by the customer (indicated by a DNIS signal). The merchant computer 52 accesses a customer record for the calling customer based on the ANI signal. Merchant server 52 inserts the customer information into the merchant product order Web page, and pushes the partially completed product order Web page to CSR computer 62. Both the call control Web page and the product order Web page are displayed on a monitor of computer 62.

The CSR receives the call from the customer. While speaking to the customer, a problem arises that requires input from the CSR's supervisor. The CSR uses the clickable set of commands on the call control Web page to select the "conference" command, and inputs the telephone number of the CSR's supervisor. Signals corresponding to the "conference" command and the supervisor's telephone number are transmitted from computer 62 via server 44 to switch 32. Switch 32 then conferences in the supervisor as requested by the CSR.

After the supervisor has resolved the problem, a second telephone call is routed by switch 32 to the CSR. The second telephone call rings on the CSR's second voice telephone line. The CSR then actuates the "hold" command on the call control Web page to place the first customer on hold to answer the second line. In response to receiving signals corresponding to the "hold" command, the switch 32 places the call on the CSR's first line on hold. The CSR then answers the incoming call on the second line.

The CSR then places the customer on the second line on hold and returns to the customer on the first line. The customer on the first line requests three items of merchandise from the merchant's catalog. The customer's credit card number that was inserted into the product order Web page by server 52 (from database 54) is confirmed (either verbally, or by computer 14) by the calling customer. The CSR fills out the product order Web page and transmits this completed product order Web page back to the merchant server 52 by clicking on a "send to merchant" command on the merchant's Web page. The CSR then actuates the "terminate" command on the call control Web page to terminate the telephone call on the first line.

After receiving the completed product order Web page, the merchant then mails the requested merchandise to the customer, and updates the merchant's records stored in database 54 to indicate the time and date of the sale, the items purchased, the CSR that accepted the order, etc., for the customer's account.

Similarly, the CSR then processes the call on the second telephone line. Switch 32 continues to forward customer calls to the CSR for processing until the CSR logs out or indicates that he or she is on break or otherwise unavailable to receive calls.

Other Applications

The present invention is not limited to the embodiments described above, but may be advantageously used in a variety of applications, for example, in which: 1) network security can be enhanced through the use of the multiple authentication techniques as described herein, such as computer authentication, telephone authentication and CSR authentication; 2) where it is desirable to provide call center functions to remotely located persons without using expensive digital lines and digital telephone equipment; and 3) where it is desirable to automatically coordinate telephone calls initiated or received by remotely located persons with computerized information provided to or received from such persons.

For example, the present invention is applicable to telemarketing applications in which telemarketing representatives work remotely from home. A call control server provides a call control web page to each representative, and a telemarketing Web server provides a telemarketing Web page to the representative's computer. The call control server accesses a list of home numbers to be called by one or more representatives. The call control server controls a switch and a VRU to sequentially call each number on the list. The VRU may automatically call a number in response to a command actuated by the CSR indicating the CSR is ready for the next call. When a call is answered, the VRU may prompt the answering party for information, selects an available representative, and transfers the call to the selected representative for processing. The representative can use the call control commands to control the call as described above.

In addition, the representative asks the answering party to purchase the product or service of interest, and inputs information relating to the answering party and his or her response into the telemarketing Web page. This information for each call is stored on the telemarketing server. The telemarketing server (in communication with the call control server) keeps track of the calls successfully made, and informs the call control server of those telephone numbers on the list that need further dialing. Alternatively, the VRU can keep track of those calls that were successfully completed. The telephone numbers that were unsuccessfully called are repeatedly called by the VRU and switch until the telemarketing server indicates that the party was successfully contacted. In addition, the VRU and call control server can keep track of the number of calls received and processed by each representative to pay each representative for each call processed.

What is claimed is:

1. A method of providing call center functionality at a representative station, the representative station including a computer and a telephone, said method comprising the steps of:

establishing a data communications link between a system computer and the station computer;

receiving computer log-in information from the station computer via the data communications link;

establishing a voice communications link between the station telephone and a telecommunications switch;

receiving telephone log-in information from the station telephone via the voice communications link;

establishing a link between the system computer and the switch such that call control commands provided from the station computer are transmitted to the switch via the system computer to control telephone calls that are received at the switch.

2. The method of claim 1 wherein said system computer comprises a call control server.

3. The method of claim 1, wherein said step of receiving computer log-in information comprises the steps of:

receiving at the system computer a computer log-in ID and password from the station computer; and authenticating the computer log-in ID and password.

4. The method of claim 1 wherein said step of receiving computer log-in information comprises the steps of:

receiving at the system computer a certificate ID of the station computer; and authenticating the computer by comparing the certificate ID to a list of certificate IDs.

5. The method of claim 1 wherein said step of receiving computer log-in information comprises the steps of:
   receiving at the system computer a Cookie or unique number from the station computer;
   authenticating the station computer by comparing the received Cookie or number to a list.

6. The method of claim 1 wherein said step of receiving computer log-in information comprises the steps of:
   receiving a computer log-in ID and password at the system computer;
   performing computer authentication by comparing the computer login ID and password to a list of computer log-in IDs and corresponding passwords.

7. The method of claim 1 wherein said step of establishing a link between the system computer and the station computer comprises the step of sending a call control page from the system computer to the station computer, said call control page comprises a set of selectable commands that allows a user of the station computer to control telephone calls received at the switch.

8. The method of claim 7 wherein said system computer dynamically obtains the address of the station computer from the station computer during said step of receiving computer log-in information, said address being used by said system computer to send the call control page to the station computer.

9. The method of claim 1 and further comprising the step of said system computer sending a merchant application page to the station computer.

10. The method of claim 1 and further comprising the steps of:
    receiving an incoming call at the switch;
    selecting the station to receive the received call;
    routing the call to the selected station for processing.

11. The method of claim 1 wherein said step of establishing a voice communications link comprises the step of placing a telephone call from the station telephone to the switch.

12. A method of providing call center functionality at a representative station the representative station including a computer and a telephone, said method comprising the steps of:
    establishing a data communications link between a system computer and the station computer;
    receiving computer log-in information from the station computer via the data communications link;
    establishing a voice communications link between the station telephone and a telecommunications switch by
      sending a signal from the system computer to the switch based on said step of receiving computer log-in information said signal requesting the switch to place a call to the station telephone; and
      placing a call from the switch to the station telephone;
    receiving telephone log-in information from the station telephone via the voice communications link;
    establishing a link between the system computer and the switch such that call control commands provided from the station computer are transmitted to the switch via the system computer to control telephone calls that are received at the switch.

13. The method of claim 1 wherein said step of receiving telephone log-in information comprises the step of:
    receiving a telephone password from the station telephone; and
    comparing the telephone password to a list of authorized telephone passwords.

14. The method of claim 13 wherein said step of receiving a telephone password comprises the step of receiving a telephone password as one or more touch tone signals.

15. The method of claim 13 wherein said step of receiving a telephone password comprises the step of receiving a telephone password as one or more spoken words or phrases.

16. A method of providing call center functionality at a representative station, the representative station including a computer and a telephone, said method comprising the steps of:
    establishing a data communications link between a system computer and the station computer;
    receiving computer log-in information from the station computer via the data communications link;
    establishing a voice communications link between the station telephone and a telecommunications switch;
    receiving telephone log-in information from the station telephone via the voice communications link by
    placing a telephone call to the station telephone; prompting a person answering the call to provide a telephone password;
    receiving the telephone password;
    comparing the received telephone password to a list of one or more authorized telephone passwords;
    permitting the station telephone to receive telephone calls received at the switch if the received telephone password is an authorized telephone password;
    establishing a link between the system computer and the switch such that call control commands provided from the station computer are transmitted to the switch via the system computer to control telephone calls that are received at the switch.

17. A method of processing a telephone call at one of a plurality of remote stations, each remote station including a computer and a telephone, said method comprising the steps of:
    receiving an incoming telephone call at a telecommunications switch;
    identifying an available authenticated station to process the received call;
    forwarding the received call to the telephone of the identified station;
    sending a call control page to the computer of the identified station, said call control page including a plurality of selectable call control commands;
    receiving a signal from the identified station corresponding to an actuated call control command; and
    controlling the received call based on the signal corresponding to the actuated call control command.

18. The method of claim 17 and further comprising the steps of:
    sending a signal from the switch to a merchant server indicating that the received call will be forwarded to the identified station; and
    sending one or more pages from the merchant server to the computer of the identified station.

19. A method of providing remote call center functionality at a remote station, the station including a computer and a telephone, said method comprising the steps of:
    using the station computer to log-in to a call control server via a data communications link;
    using the station telephone to log-in to a telecommunications switch via a voice communications link;

receiving a telephone call at the switch;

selecting the remote station from one or more stations to receive the call;

transferring the call to the station telephone;

sending a call control page from the call control server to the station computer, the call control page including one or more selectable call control commands; and actuating one of the call control commands on the call control web page, a signal corresponding to the actuated command being provided from the station computer to the switch via the call control server to control the received call.

20. The method of claim 19 and further comprising the steps of:

sending a signal from the switch to a merchant server indicating that the received call will be forwarded to the telephone of the selected station, said signal including at least the address of the computer of the selected station;

sending a merchant application page from the merchant server to the computer of the selected station based on the address of the computer.

21. The method of claim 20 and further comprising the step of processing the call by receiving customer purchase information over the station telephone and using the station computer to input data into one or more fields of the merchant application page.

22. A method of processing a telephone call at one of a plurality of remote stations, each remote station including a computer and a telephone, said method comprising the steps of:

receiving an incoming telephone call at a telecommunications switch;

answering the call and prompting the caller to provide information;

storing information received from said caller;

identifying an available station to process the received call;

sending a signal to a merchant server indicating that the received call will be forwarded to the computer of the identified station, said signal including the address of the computer of the identified station;

forwarding the received call to the telephone of the identified station;

sending one or more pages, including at least some of said information received from said caller, from the merchant server to the computer of the identified station based on the the address of the computer;

sending a call control web page from a call control server to the computer of the identified station;

actuating a call control command in the call control web page, a signal corresponding to said actuated command being forwarded to the switch to control the received call.

23. The method of claim 22 wherein said step of identifying an available station to process the received call comprises the steps of:

sending a signal from the switch to the call control server requesting that the call control server identify an available station;

the call control server selecting an available station; and receiving a signal at the switch from the call control server identifying the available station to receive the call.

24. The method of claim 22 wherein said call control commands include one or more commands from the list consisting of:

an answer command instructing the switch that the telephone call should be connected to the station telephone;

a hang-up or terminate command instructing the switch that the telephone call should be terminated;

a transfer command instructing the switch that the telephone call should be transferred to another party;

a conference command instructing the switch to conference in another party for the telephone call;

a hold command instructing the switch to place the call on hold;

one or more speed dial commands instructing the switch to transfer the call to a party specified by the speed dial button; and a break request/break return command instructing the switch that the representative is unavailable on break/or has returned from break and is now available to receive calls, respectively.

25. A method of providing secure communications between a system and a user station, the user station including a telephone and a computer, said method comprising the steps of:

establishing a data link between the station computer and a data server;

authenticating the user via computer;

placing a call to the station telephone in response to said step of authenticating;

authenticating the user by telephone;

providing information to the user via telephone or via said data link only if the user has been authenticated by computer and by telephone.

26. The method of claim 25 wherein said step of authenticating the user via computer comprises the steps of:

using the station computer to provide a login-ID and password to the data server;

authenticating the login-ID and password.

27. The method of claim 25 wherein said step of authenticating the user via computer comprises the steps of:

providing a Certificate ID or number from the station computer to the data server; and authenticating the Certificate ID or number.

28. The method of claim 25 wherein said step of authenticating the user by telephone comprises the steps of:

prompting the user for a telephone password;

receiving the telephone password input by the user; and authenticating the telephone password.

29. The method of claim 28 wherein said telephone password is input by the user using touch tone buttons on the station telephone.

30. The method of claim 28 wherein said telephone password is input by the user speaking into the station telephone.

31. The method of claim 25 wherein said step of providing information to the user comprises the step of routing a customer call to the station telephone only if the user has been authenticated by computer and by telephone.

32. The method of claim 25 wherein said step of providing information to the user comprises the step of providing a call control web page to the station computer only if the user has been authenticated by computer and by telephone.

33. The method of claim 25 wherein said step of providing information to the user comprises the step of providing an application web page to the station computer only if the user has been authenticated by computer and by telephone.

* * * * *